United States Patent
Has et al.

(10) Patent No.: US 9,835,645 B2
(45) Date of Patent: Dec. 5, 2017

(54) ACCELERATION SENSOR AND METHOD FOR PRODUCING AN ACCELERATION SENSOR

(71) Applicant: Robert Bosch GmbH, Stuttgart (DE)

(72) Inventors: Remigius Has, Grafenau-Daetzingen (DE); Mirko Hattass, Stuttgart (DE); Frederik Ante, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 681 days.

(21) Appl. No.: 14/056,213

(22) Filed: Oct. 17, 2013

(65) Prior Publication Data

US 2014/0102196 A1   Apr. 17, 2014

(30) Foreign Application Priority Data

Oct. 17, 2012   (DE) .................. 10 2012 218 906

(51) Int. Cl.
*G01P 15/00* (2006.01)
*G01P 15/097* (2006.01)
*G01P 15/125* (2006.01)

(52) U.S. Cl.
CPC .......... *G01P 15/097* (2013.01); *G01P 15/125* (2013.01)

(58) Field of Classification Search
CPC ............................ G01P 15/097; G01P 15/125
USPC ..................................................... 73/514.15
See application file for complete search history.

(56) References Cited

U.S. PATENT DOCUMENTS

| | | | | |
|---|---|---|---|---|
| 5,233,213 A * | 8/1993 | Marek | ................ | G01P 15/0802 257/415 |
| 5,249,465 A | 10/1993 | Bennett et al. | | |
| 6,196,067 B1 * | 3/2001 | Martin | ................ | G01P 15/0802 73/514.32 |
| 6,307,452 B1 * | 10/2001 | Sun | .................... | H01H 59/0009 333/262 |
| 2004/0244191 A1 * | 12/2004 | Orr | ...................... | H05K 3/4092 29/842 |
| 2007/0209437 A1 * | 9/2007 | Xue | ...................... | B81B 3/0032 73/514.31 |
| 2011/0140578 A1 * | 6/2011 | Ko | ...................... | B60C 23/0411 310/339 |

(Continued)

FOREIGN PATENT DOCUMENTS

| | | |
|---|---|---|
| EP | 1 319 927 A1 | 6/2003 |
| EP | 1 335 187 A1 | 8/2003 |
| FR | 2 719 906 A1 | 11/1995 |

*Primary Examiner* — Lisa Caputo
*Assistant Examiner* — Tarun Sinha
(74) *Attorney, Agent, or Firm* — Maginot, Moore & Beck LLP

(57) ABSTRACT

An acceleration sensor includes a circuit board with a recess that exposes a spring structure. The spring structure is formed from a material of the circuit board exposed by the recess and includes a vibrating element that is held in a resilient manner via at least one spring element. The sensor further includes a reference element connected rigidly to the circuit board and arranged at a distance from and opposite the vibrating element, an electrical circuit arranged on the vibrating element at a distance from the reference element, and at least one detection element. The circuit is configured to evaluate a signal that is configured to be influenced by a change in distance between the reference element and the at least one detection element in order to sense an acceleration of the acceleration sensor.

20 Claims, 2 Drawing Sheets

(56) References Cited

U.S. PATENT DOCUMENTS

2011/0174076 A1     7/2011  Classen et al.
2011/0186943 A1*    8/2011  Pahl ..................... B81B 7/0064
                                                        257/416
2012/0125104 A1*    5/2012  Qiu ....................... G01P 15/125
                                                        73/514.32
2013/0167632 A1*    7/2013  Huang ............... G01R 33/0286
                                                        73/493

* cited by examiner

ACCELERATION SENSOR AND METHOD FOR PRODUCING AN ACCELERATION SENSOR

This application claims priority under 35 U.S.C. §119 to patent application No. DE 10 2012 218 906.8, filed on Oct. 17, 2012 in Germany, the disclosure of which is incorporated herein by reference in its entirety.

BACKGROUND

The present disclosure relates to an acceleration sensor and to a method for producing an acceleration sensor.

Cost-effective acceleration sensors are typically provided as MEMS sensors (MEMS=micro-electro-mechanical system). To this end, a spring-mass structure is etched in silicon and the deflection of the mass is determined by a suitable evaluation method and output as an acceleration signal.

SUMMARY

Against this background, the present disclosure provides an acceleration sensor and a method for producing an acceleration sensor having the features of the disclosure. Advantageous embodiments can be found in the respective dependent claims and the following description.

A common circuit board can be used to produce a spring-mass system. If a suitable evaluation circuit is coupled to the spring-mass system, an acceleration sensor can be realized. Such an acceleration sensor can manage without an actual MEMS element and can therefore be realized produced in a cost-effective and easy manner.

A corresponding acceleration sensor can be realized by the creation of a spring-mass system from a PCB (PCB=printed circuit board) and the evaluation circuit itself. According to one embodiment, the evaluation circuit is structured for example in the form of an ASIC such that one or more detection structures are formed, for example, on one side of the evaluation circuit, so that the deflection with respect to a fixed structure can be measured thereby.

Such an acceleration sensor is suitable for example for realizing a simple switch which is based only on changes in position. Such an acceleration sensor can be embodied with 2 bits per axis, for example only at the top/bottom, or optionally with 3 bits. For such a switch, the described acceleration sensor is cost-effective enough compared with an actual MEMS acceleration sensor but nevertheless provides the performance required for this purpose.

An acceleration sensor has the following features:

a circuit board having a recess exposing a spring structure, wherein the spring structure is formed from a material, exposed by the recess, of the circuit board and has a vibrating element which is held in a resilient manner via at least one spring element;

a reference element;

an electrical circuit which is arranged at a distance from the reference element and has at least one detection element, wherein the circuit is configured to evaluate a signal that is able to be influenced by a change in distance between the reference element and the at least one detection element in order to sense an acceleration of the acceleration sensor; and wherein either the electrical circuit is arranged on the vibrating element and the reference element is connected rigidly to the circuit board and is arranged at a distance from and opposite the vibrating element, or the reference element is arranged on the vibrating element and the electrical circuit is connected rigidly to the circuit board and is arranged at a distance from and opposite the vibrating element.

By means of an acceleration sensor, it is possible to detect an acceleration of an object to which the acceleration sensor is coupled. For example, the acceleration sensor can be used to sense an actuation of a switch or a change in a movement of an apparatus, for example a vehicle or a mobile device. The acceleration sensor may be configured to output or provide an electric signal in response to a sensed acceleration, said signal indicating the sensed acceleration. Depending on the embodiment, the acceleration sensor may be configured to indicate a direction of a sensed acceleration and additionally or alternatively to indicate a value of a sensed acceleration.

A circuit board may be understood to be a support for electronic components. Such electronic components may be manufactured separately from the circuit board and be connected to suitable contacting points of the circuit board by a suitable joining process, for example soldering or bonding. By way of the joining process, an electrically conductive connection between a conductor track of the circuit board and an electrical terminal contact of the electrical component can be created. The circuit board can also be known as a circuit card, board or printed circuit. The circuit board or at least essential parts of the circuit board, for example the conductor tracks, can be embodied without the use of semiconductor material. It may thus be a semiconductor-free circuit board.

The recess may represent a cavity extending into a body of the circuit board. The recess may extend into the circuit board from an outer surface of the circuit board and in this case not pass all the way through the circuit board or else pass through the circuit board as a through-opening. The recess in the circuit board may be produced during the manufacture of the circuit board in that individual layers of the circuit board are provided with depressions or through-holes before or after being placed on a stack forming the circuit board. The recess may extend partially alongside and, with respect to the outer surface, beneath the spring structure. The spring structure may be formed by one or more layers, facing the outer surface, of the circuit board. The vibrating element may be formed in a plate-like manner. The at least one spring element may be embodied as a rectilinear, curved or angled web. A first end of the spring element may be connected to the vibrating element and an opposite second end of the spring element may be connected to the material, surrounding the spring structure, of the circuit board.

Depending on the embodiment, the spring element may be configured so as to allow the vibrating element to move in one or more directions. For example, the spring element may be configured to allow the vibrating element to move orthogonally to a plane of the outer surface of the circuit board and additionally or alternatively to allow the vibrating element to move parallel to the plane of the outer surface. The spring element may be configured to return the vibrating element to a rest position of the vibrating element in the event of a deflection.

Depending on the embodiment, either the reference element can be embodied in a movable manner and the detection element in a rigid manner with respect to the circuit board, or vice versa.

The reference element can be embodied as an electrically conductive layer, for example in the form of an electrode. The reference element may be arranged on a carrier structure spanning the spring structure and firmly connected to the circuit board or be part of such a carrier structure. According to a further embodiment, the reference element may be arranged on the circuit board in the region of the recess, opposite the vibrating element. Thus, the reference element may also be under the detection element, i.e. directly on the circuit board. The reference element may be electrically connected to the circuit board via an electrical line or be electrically insulated from the circuit board.

The electrical circuit may be an integrated circuit, for example an ASIC or an FPGA. The circuit may be based on a semiconductor material. The circuit may have electrical contacts, for example soldering contacts, via which the circuit can be mechanically and electrically connected to corresponding contacts of the vibrating element. For example, the electrical circuit may be supplied with an electrical operating voltage via electrical lines of the spring structure. The circuit can be fastened as a discrete component to the vibrating element and thus be manufactured independently of the circuit board. The detection element may have an electrically conductive structure, for example in the form of an electrode or a coil. The detection element may be arranged on an outer side of a body or of a housing of the electrical circuit. The detection element may be connected to a contact of the electrical circuit via an electrical line or represent such a contact. The detection element may be arranged opposite the reference element. The circuit may be configured to evaluate a capacitive or inductive coupling between the detection element and the reference element in order to detect the change in distance. Furthermore, the circuit may be configured to sense the acceleration of the acceleration sensor from a temporal profile and additionally or alternatively from an extent of the change in distance.

According to one embodiment, the circuit board may have at least one insulating layer composed of an electrically insulating material and at least one patterned conducting layer composed of an electrically conductive material. In this case, the spring structure may comprise the at least one insulating layer and the at least one conducting layer. Connection lines of the electrical circuit may be routed via the conducting layer. The conductive material may be copper. The insulating layer may comprise plastics material, for example. For example, it may be a resin. Alternatively, the insulating layer may be produced from Teflon or ceramic, for example.

The electrical circuit may represent an integrated circuit fastened to the vibrating element by means of a join connection. The join connection may be a soldered connection. If the electrical circuit is fastened to the vibrating element by a soldering process, then one or more further circuits can be fastened to the outer surface of the circuit board in the same process step.

The detection element may be embodied as a flat electrode or as a coil. If the detection element is embodied as an electrode, the electrical circuit may be configured to determine the acceleration via a capacitive evaluation. If the detection element is embodied as a coil or a winding, the electrical circuit may be configured to determine the acceleration via an eddy-current evaluation.

The spring element may be realized in various ways. For example, the spring element may be formed as a spiral spring. A spiral spring allows movements of the vibrating element in different spatial directions. The spring element may also have a plurality of contact points, for example four contact points (one on each side) with the frame formed by the circuit board. The spring element may be constructed for example from a plurality of individual springs or a plurality of individual spring sections which may be connected both to the circuit board and to the vibrating element.

According to one embodiment, the electrical circuit may have a plurality of detection elements and be configured to evaluate a plurality of signals that are able to be influenced by a change in distance between the reference element and the plurality of detection elements in order to sense accelerations of the acceleration sensor in at least two directions that are orthogonal to one another. For example, at least two detection elements, three detection elements or four detection elements may be arranged alongside one another in a plane. The at least two directions that are orthogonal to one another may comprise one lateral and one vertical, two lateral or one vertical and two lateral directions of movement with respect to the plane of the outer surface of the circuit board, for example.

The acceleration sensor may have a housing which is connected rigidly to the circuit board. The housing may span the spring structure with the electrical circuit. In this case, the housing may comprise the reference element. The housing may be composed for example of metal or plastics material. The housing may also comprise a potting compound or be formed by a potting compound. For example, the reference element may be arranged on the housing, be integrated into a material of the housing or be formed by a section of the housing.

According to one embodiment, the reference element may comprise at least one electrode. If the circuit comprises a plurality of detection elements, the area of the electrode can extend over the plurality of detection elements. It is also possible for a separate reference element to be provided for each detection element.

The electrical circuit may be configured to sense the change in distance between the reference element and the at least one detection element by way of a capacitive or eddy-current evaluation method. Such evaluation methods are very precise.

A method for producing an acceleration sensor comprises the following steps of:

providing a circuit board having a recess exposing a spring structure, wherein the spring structure is formed from a material, exposed by the recess, of the circuit board and has a vibrating element which is held in a resilient manner via at least one spring element;

providing an electrical circuit which has at least one detection element, wherein the circuit is configured to evaluate a signal that is able to be influenced by a change in distance between a reference element and the at least one detection element in order to sense an acceleration of the acceleration sensor; and connecting the reference element rigidly to the circuit board so that the reference element is arranged at a distance from and opposite the at least one detection element, or arranging the reference element on the vibrating element and connecting the electrical circuit rigidly to the circuit board so that the reference element is arranged at a distance from and opposite the at least one detection element.

BRIEF DESCRIPTION OF THE DRAWINGS

The disclosure is explained in more detail by way of example in the following text with reference to the appended drawings, in which.

DETAILED DESCRIPTION

In the following description of preferred exemplary embodiments of the present disclosure, identical or similar reference signs are used for the similarly acting elements illustrated in the various figures, a repeated description of these elements being omitted.

Figure 1:
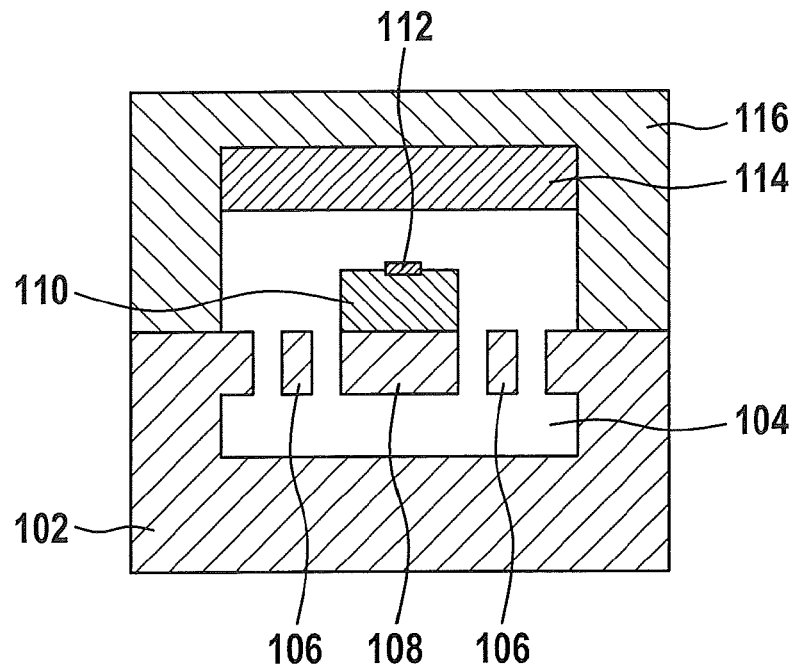
FIG. 1 shows a cross section through an acceleration sensor according to one exemplary embodiment of the present disclosure.

FIG. 1 shows a cross section through an acceleration sensor according to one exemplary embodiment of the present disclosure. The acceleration sensor comprises a circuit board 102 which has a patterned recess 104. The recess 104 comprises a cavity located in the interior of the circuit board 102, said cavity extending in places as far as an outer side, here the surface of the circuit board 102. By way of the patterned recess 104, a spring structure is exposed from the material of the circuit board 102. The spring structure comprises a spring element 106 and a vibrating element 108. The spring element 106 and the vibrating element 108 are constructed from one or more outer layers of the circuit board 102. The spring element 106 and the vibrating element 108 have the same thickness. The cavity of the recess 104 extends through beneath the spring element 106 and the vibrating element 108 and, apart from connecting points between the spring element 106 and the main body of the circuit board 102 and the vibrating element 108, laterally alongside the spring element 106 and the vibrating element 108. In this way, the vibrating element 108 can execute a relative movement with respect to the main body of the circuit board 102. The main body can be understood here to mean, apart from the spring structure, all of the rest of the circuit board 102. If a force is exerted on the main body of the circuit board 102, said force bringing about an acceleration of the circuit board 102, this causes the relative movement between the main body of the circuit board 102 and the vibrating element 108. The spring element 106 is configured to return the vibrating element 108 to the rest position shown in FIG. 1 after a deflection with respect to the main body of the circuit board 102.

The acceleration sensor has an electrical circuit 110 which is arranged on and fastened to a surface of the vibrating element 108. The circuit 110 is arranged on a surface, opposite the cavity of the recess 104, of the vibrating element 108. The circuit 110 rises above the outer side of the circuit board 102. At least one detection element 112 is arranged on a surface, facing away from the vibrating element 108, of the circuit 110. In FIG. 1, the detection element 112 is illustrated only schematically. The detection element 112 may be placed on the surface of the circuit 110, be integrated into the surface or the circuit or be part of the surface of the circuit 110. One detection element 112 may be provided or a plurality of detection elements 112 may be provided, as is shown for example in FIG. 2. The detection element 112 may be embodied as an electrode or a coil structure.

Arranged opposite the detection element 112 and at a distance from the detection element 112 is a reference element 114, for example in the form of an electrode. The reference element 114 extends at least partially over the circuit 110. The reference element 114 is connected rigidly to the main body of the circuit board 102.

The detection element 112, the circuit 110 and the vibrating element 108 are connected rigidly together and, on account of the movable connection via the spring element 106, can execute a common relative movement with respect to the main body of the circuit board 102. Such a relative movement causes a change in distance between the detection element 112 and the reference element 114.

The circuit 110 is connected to the detection element 112 via an electrical line. Optionally, the circuit 110 is connected to the reference element 114 via a further electrical line. The circuit 110 is configured to apply an evaluation signal at least to the detection element 112 and to evaluate a change in the evaluation signal or a reaction signal brought about by the evaluation signal. For example, the circuit 110 may be configured to apply a voltage, as evaluation signal, to the detection element 112 or to pass a current through the detection element 112. The change in the evaluation signal may be for example a change in voltage. The reaction signal may be for example a voltage applied between the detection element 112 and the reference element 114 or a current flowing through the detection element 12. The circuit 110 is configured to evaluate the change in the evaluation signal or the reaction signal and, on the basis thereof, to determine the distance or a change in distance between the detection element 112 and the reference element 114 or to determine an acceleration that is acting or has acted on the acceleration sensor. Suitable evaluation methods can be used for this purpose. For example, the detection element 112 and the reference element 114 may form a capacitance and the circuit 110 may be configured to evaluate a capacitance value, depending on the distance between the detection element 112 and the reference element 114, of the capacitance. Alternatively, the detection element 112 may be suitable for creating an eddy current in the reference element 114 and for sensing an effect, for example a magnetic field or an induced current, caused by the eddy current, the eddy current and the effect caused by the eddy current being dependent on the distance between the detection element 112 and the reference element 114. The circuit 110 is configured to output information about the distance or the change in distance between the detection element 112 and the reference element 114. Alternatively, the circuit 110 may be configured to determine, on the basis of the change in the evaluation signal or the reaction signal or on the basis of the distance or the change in distance, the acceleration which has acted on the acceleration sensor. In this case, the circuit 110 may be configured to output information about the determined acceleration.

The circuit 110 may be connected to the main body of the circuit board 102 lines routed via the spring element 106. A transmission of data and an energy supply, for example, may take place via such lines. The lines may be routed via one or more electrically conductive layers of the circuit board 102. Two electrically conductive layers may in this case be spaced apart from one another by an electrically insulating layer, for example composed of plastics material or resin. The circuit board 102 can thus be constructed from a stack of electrically conductive and electrically insulating layers, all or some of which are used to form the spring structure.

According to the exemplary embodiment shown in FIG. 1, the acceleration sensor has a housing 116 which is placed on the main body of the circuit board 102 and encloses the spring structure together with the circuit 110 with the detection element 112. The reference element 114 is arranged on an inner surface, opposite the detection element 112, of the housing 116.

An interior space located between the detection element 112 and the reference element 114 may be connected to the recess 104 and be filled with a fluid, in particular a gas, or be empty.

According to one exemplary embodiment, the acceleration sensor is produced without MEMS on the basis of techniques in the art of mounting and connection technology. The circuit board 102 is embodied as a printed circuit board and the circuit 110 is embodied as an ASIC. Located on the top side of the circuit 110 are detection structures that form the at least one detection element 112. The housing 112 is formed by a molding compound or a cover and the reference element 114 is embodied as a cover electrode. FIG. 1 shows a side view of a corresponding overall structure of the acceleration sensor.

According to an alternative exemplary embodiment, the reference element 114 may also be arranged at the bottom of the recess 105, opposite the vibrating element 108.

Figure 2:
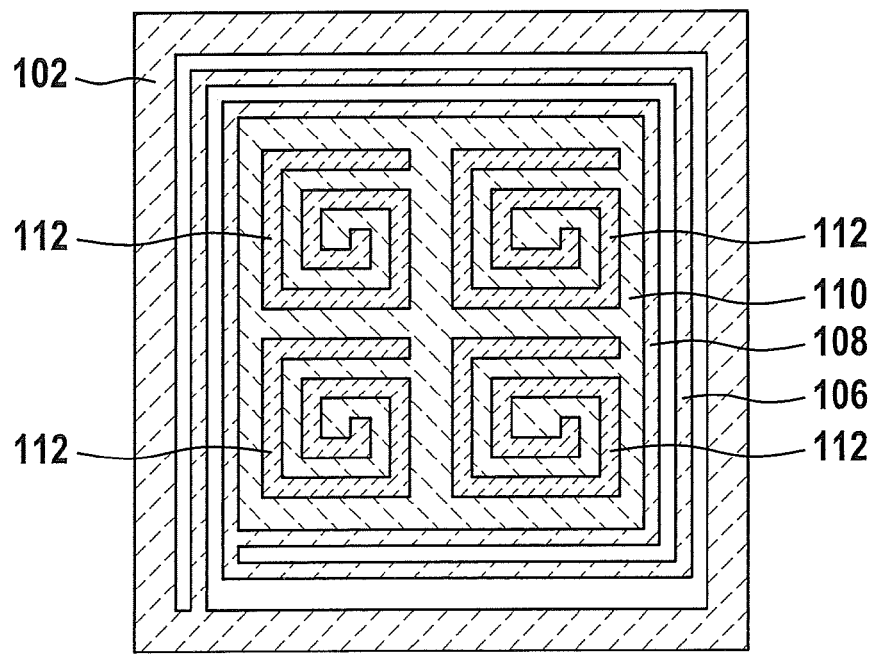
FIG. 2 shows a plan view of an acceleration sensor according to one exemplary embodiment of the present disclosure.

FIG. 2 shows a plan view of an acceleration sensor according to one exemplary embodiment of the present disclosure. In this case, it may be the acceleration sensor described with reference to FIG. 1.

The acceleration sensor is shown without a housing and reference element, and so the detection elements 112 located on the top side of the circuit 110 can be seen. According to this exemplary embodiment, four detection elements 112 are provided. The four detection elements 112 are arranged in each case at the corners of an imaginary square. The detection elements 112 are each in the form of a planar coil by way of which an eddy current can be induced in the reference element. Alternatively, the detection elements 112 may be embodied as planar, for example rectangular or round electrodes.

The circuit 110 is embodied in a rectangular manner. The surface of the vibrating element 108, on which the circuit 110 is arranged, is matched to the circuit 110 in terms of its size. The vibrating element 108 is embodied in a rectangular manner and has a peripheral edge protruding beyond a surface covered by the circuit 110. The spring element 106 is embodied as a web which is routed in an angled manner between the vibrating element 108 and the main body of the circuit board 102. According to this exemplary embodiment, the spring element 106 is embodied in a spiral manner encircling the vibrating element 108. Alternatively, the spring structure may also have two or more spring elements 106 which are embodied for example in each case as a web connecting the vibrating element 108 to the main body of the circuit board.

According to one exemplary embodiment, the acceleration sensor shown in FIG. 2 is embodied as a three-channel sensor with eddy current detection, wherein the circuit 110 in the form of an ASIC is shown from above. The spring element 106 is embodied as a spiral spring and the detection elements 112 are embodied as transmitting coils.

Figure 3:
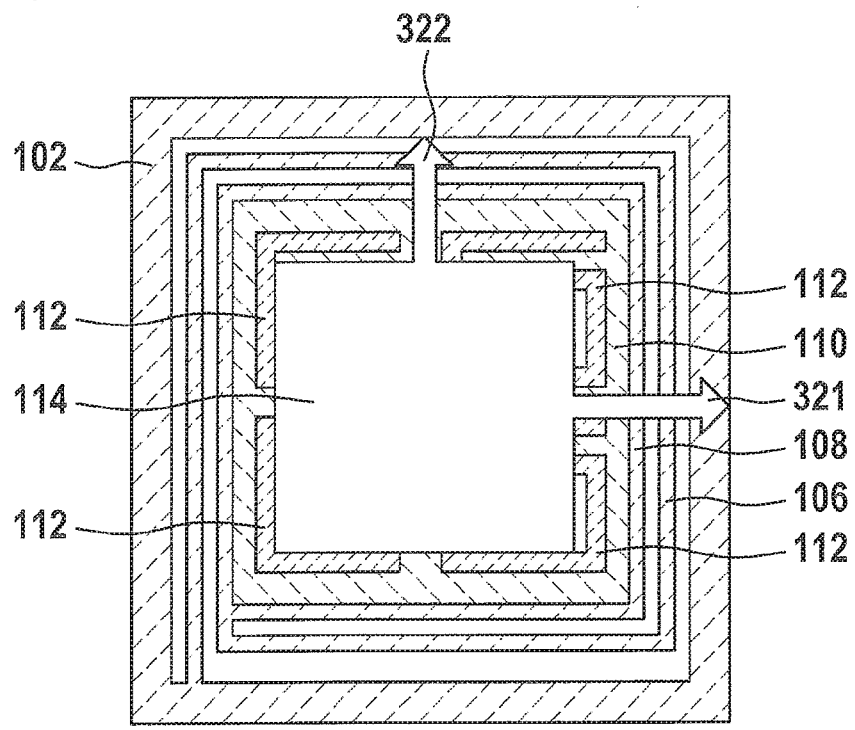
FIG. 3 shows a plan view of an acceleration sensor according to one exemplary embodiment of the present disclosure.

FIG. 3 shows a plan view of an acceleration sensor according to one exemplary embodiment of the present disclosure. This may be the acceleration sensor described with reference to FIG. 2, with the reference element 114 additionally being shown in FIG. 3. A plan view with an opposite detection structure is thus shown. The reference element 114 is embodied in a rectangular, in this case square manner. The reference element 114 is arranged centrally with respect to the arrangement of the four detection elements 112. The reference element 114 has a surface area which is smaller than a surface area, taken up by the four detection elements 112, on the circuit 110.

According to this exemplary embodiment, the circuit 110 is configured to sense accelerations, or relative movements or deflections caused by the accelerations, between the detection elements 112 and the reference element in two directions 321, 322 which are orthogonal to one another and are oriented parallel to a plane in which the detection elements 112 are arranged. Additionally or alternatively, the circuit 110 may be configured to sense a further acceleration, or a relative movement or deflection caused by the further acceleration, between the detection elements 112 and the reference element in a further direction which is orthogonal to the directions 321, 322.

Exemplary embodiments of the present disclosure are described in more detail in the following text with reference to the preceding figures.

The sensor shown consists of a substrate composed of a circuit board 102. This substrate of the circuit board 102 may be patterned so that a spring structure 106, 108 having an underlying cavity 104 is produced therein. The electrical supply lines of the circuit 110 can be routed via remaining webs 106, excluded from the recess 104, of the spring structure. Since, in general, multilayer circuit boards 102 are possible, all of the necessary connections can be produced, that is to say connections for an operating voltage (VDD), ground (GND) and data. The circuit 110 in the form of an evaluation circuit can be placed on the vibrating element 108 in the form of an inner structure. The connection of the circuit 110 to the electrical supply lines can be established via through-contacts or bonding wires. The spring-mass system 106, 108, 110, 112 is closed by a cap 116, for example made of molding compound or some other material, and is connected to the outer, fixed region of the circuit board 102 in a suitable manner. A reference element 114 in the form of a further electrode which is likewise connected, depending on the evaluation method, to the circuit board 102 or to the circuit 110, for example in the form of an ASIC, can be introduced into the cover 116. In the case of evaluation with an eddy-current method, the electrical connection to the reference element 114 may be omitted.

The detection structures 112 on the circuit 110 may be produced directly on the top side from a CMOS metal stack from which the circuit 110 is constructed. The detection structures 112 may be simply flat electrodes for a capacitive evaluation or be in the form of a coil for an eddy-current evaluation method.

In the case of a suitable design of the spring structures 106, 108 in the circuit board 102, a three-axis acceleration sensor may also be realized. For this purpose, the spring element 106, which forms a spring 106, may be embodied for example as a spiral spring, so that the spring-mass system 106, 108, 110, 112 can be moved under the stationary detection electrode 114. If, in addition, the detection structure 112, suitable for capacitive or eddy-current sensing, on the circuit 110 is divided into four segments, both the lateral and, by evaluation of the aggregate signal, vertical movement can be sensed by difference formation.

The proposed sensor can be used for applications with low requirements placed on the acceleration sensor element, essentially for top/bottom detection, for which a typical MEMS acceleration sensor provides "too much" performance or is too expensive. Conceivable application fields of the acceleration sensor are in this case for example flaps or covers on domestic appliances, process monitoring, for example parcel shipment, "do not tilt", or pure portrait/landscape detection in cameras/cellular telephones.

Figure 4:
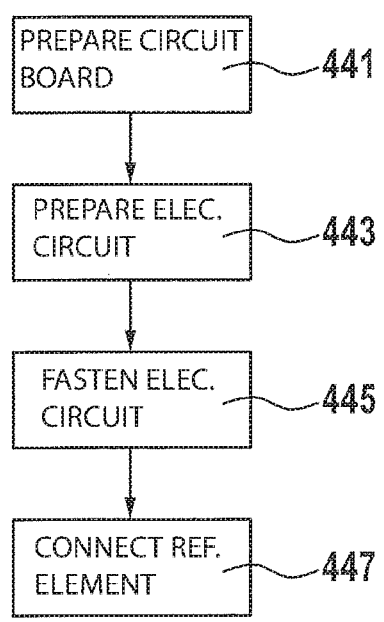
FIG. 4 shows a flowchart of a method for producing an acceleration sensor according to one exemplary embodiment of the present disclosure.

FIG. 4 shows a flowchart of a method for producing an acceleration sensor according to one exemplary embodiment of the present disclosure. This may be an acceleration sensor as has been described hereinabove.

In a step 441, a circuit board having a recess exposing a spring structure is prepared, as has already been described hereinabove. In a step 443, an electrical circuit is prepared, as has already been described hereinabove. In a step 445, the electrical circuit is fastened to the vibrating element of the spring structure of the circuit board. In a step 447, a reference element is connected rigidly to the circuit board such that the reference element is arranged at a distance from and opposite the at least one detection element of the electrical circuit.

Even though a rigid arrangement of the reference element and a movable arrangement of the detection element on the vibrating element have been described with reference to the exemplary embodiments, the arrangement can also be embodied the other way round.

The exemplary embodiments described and shown in the figures have only been chosen by way of example. Various exemplary embodiments can be combined with one another fully or with respect to individual features. Also, one exemplary embodiment can be supplemented by features of a further exemplary embodiment. If an exemplary embodiment comprises an "and/or" link between a first feature and a second feature, this should be read as meaning that the exemplary embodiment has both the first feature and the second feature according to one embodiment and either only the first feature or only the second feature according to a further embodiment.

What is claimed is:

1. An acceleration sensor, comprising:
   a printed circuit board having a recess that exposes a spring structure, the spring structure being formed from a material of the printed circuit board exposed by the recess and including a vibrating element arranged in a resilient manner via at least one spring element of the spring structure, the printed circuit board being a semiconductor-free circuit board;
   a reference element; and
   an electrical circuit arranged at a distance from the reference element and including at least one detection element, the electrical circuit being configured to evaluate a signal that is influenced by a change in distance between the reference element and the at least one detection element in order to sense an acceleration of the acceleration sensor,
   wherein either the electrical circuit is arranged on the vibrating element and the reference element is connected rigidly to the printed circuit board and is arranged at a distance from and opposite the vibrating element, or the reference element is arranged on the vibrating element and the electrical circuit is connected rigidly to the printed circuit board and is arranged at a distance from and opposite the vibrating element.

2. The acceleration sensor according to claim 1, wherein the printed circuit board has at least one insulating layer composed of an electrically insulating material and at least one patterned conducting layer composed of an electrically conductive material, wherein the spring structure comprises the at least one insulating layer and the at least one conducting layer, and wherein connection lines of the electrical circuit are routed via the conducting layer.

3. The acceleration sensor according to claim 2, wherein the insulating layer comprises plastics material.

4. The acceleration sensor according to claim 1, wherein the electrical circuit is configured as an integrated circuit fastened to the vibrating element by a join connection.

5. The acceleration sensor according to claim 1, wherein the detection element is configured as a flat electrode or a coil.

6. The acceleration sensor according to claim 1, wherein the spring element is formed as a spiral spring.

7. The acceleration sensor according to claim 1, wherein the electrical circuit has a plurality of detection elements and is configured to evaluate a plurality of signals that are configured to be influenced by a change in distance between the reference element and the plurality of detection elements in order to sense accelerations of the acceleration sensor in at least two directions that are orthogonal to one another.

8. The acceleration sensor according to claim 1, further comprising a housing that is connected rigidly to the printed circuit board and spans the spring structure with the electrical circuit, the housing including the reference element.

9. The acceleration sensor according to claim 1, wherein the reference element comprises at least one electrode.

10. The acceleration sensor according to claim 1, wherein the electrical circuit is configured to sense the change in distance between the reference element and the at least one detection element by way of a capacitive or eddy-current evaluation method.

11. A method for producing an acceleration sensor, comprising:
    exposing a spring structure in a recess of a circuit board, the spring structure being formed from a material of the circuit board exposed by the recess and including a vibrating element arranged in a resilient manner via at least one spring element; and
    arranging an electrical circuit with at least one detection element on the vibrating element and connecting a reference element rigidly to the circuit board so that the reference element is arranged at a distance from and opposite the at least one detection element, or arranging the reference element on the vibrating element and connecting the electrical circuit rigidly to the circuit board so that the reference element is arranged at a distance from and opposite the at least one detection element,
    wherein the electrical circuit is configured to evaluate a signal that is configured to be influenced by a change in distance between the reference element and the at least one detection element in order to sense an acceleration of the acceleration sensor.

12. The acceleration sensor according to claim 1, wherein:
    the printed circuit board includes a plurality of insulating layers and a plurality of conducting layers, and
    the spring structure includes at least one insulating layer of the plurality of insulating layers and at least one conducting layer of the plurality of conducting layers.

13. The acceleration sensor according to claim 12, wherein the vibrating element includes the at least one insulating layer of the plurality of insulating layers and the at least one conducting layer of the plurality of conducting layers.

14. The acceleration sensor according to claim 13, wherein the spring structure and the vibrating element do not include silicon.

15. The acceleration sensor according to claim 1, wherein:
    the printed circuit board includes a plurality of layers, and
    no layers of the plurality of layers include silicon.

16. An acceleration sensor, comprising:
a circuit board having a recess that defines a spring structure, the spring structure formed from the circuit board and including a vibrating element arranged in a resilient manner via at least one spring element of the spring structure;
a reference element; and
an electrical circuit arranged at a distance from the reference element and including at least one detection element, the electrical circuit configured to evaluate a signal that is influenced by a change in distance between the reference element and the at least one detection element in order to sense an acceleration of the acceleration sensor,
wherein the electrical circuit is arranged on the vibrating element and the reference element is connected rigidly to the circuit board and is arranged at a distance from and opposite the vibrating element.

17. The acceleration sensor according to claim 16, wherein:
the circuit board has at least one insulating layer composed of an electrically insulating material and at least one patterned conducting layer composed of an electrically conductive material,
the spring structure comprises the at least one insulating layer and the at least one conducting layer, and
connection lines of the electrical circuit are routed via the conducting layer.

18. The acceleration sensor according to claim 17, wherein the insulating layer comprises a plastic material.

19. The acceleration sensor according to claim 16, wherein the electrical circuit is configured as an integrated circuit fastened to the vibrating element by a join connection.

20. The acceleration sensor according to claim 16, wherein the electrical circuit has a plurality of detection elements and is configured to evaluate a plurality of signals that are configured to be influenced by a change in distance between the reference element and the plurality of detection elements in order to sense accelerations of the acceleration sensor in at least two directions that are orthogonal to one another.

* * * * *